(No Model.)  4 Sheets—Sheet 1.

O. W. NOBLE.
HOT WATER BOILER.

No. 382,659. Patented May 8, 1888.

Witnesses:
E. E. Hamill
E. D. Blackwell

Inventor:
O. W. Noble
By C. B. Tuttle
Att'y (No Model.) 4 Sheets—Sheet 2.

O. W. NOBLE.
HOT WATER BOILER.

No. 382,659. Patented May 8, 1888.

WITNESSES:
C. E. Hamill
E. L. Blackwell

INVENTOR:
O. W. Noble.
By C. B. Tuttle
Att'y.

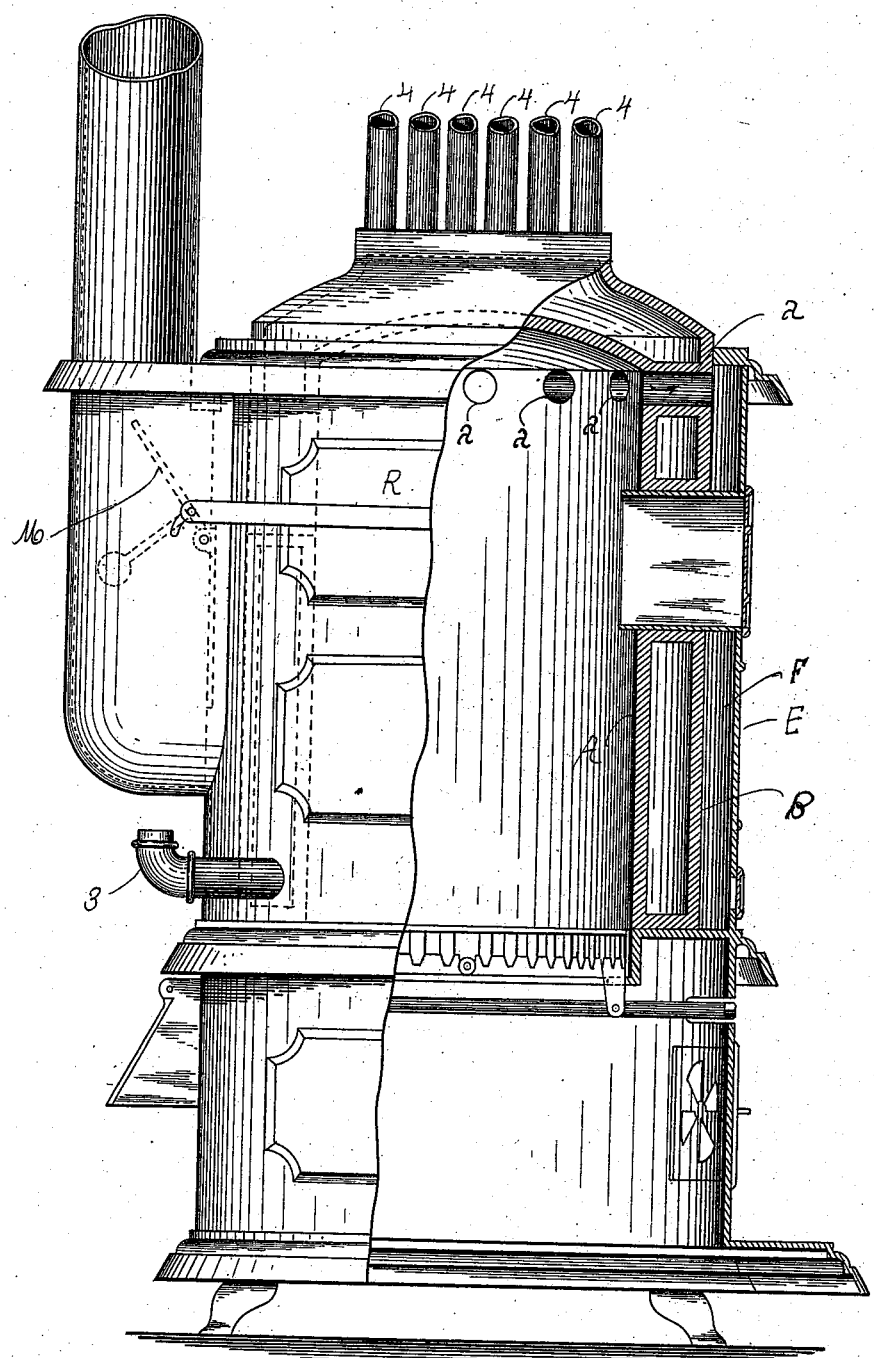

(No Model.) 4 Sheets—Sheet 4.

O. W. NOBLE.
HOT WATER BOILER.

No. 382,659. Patented May 8, 1888.

Witnesses:
E. E. Hamill.
E. L. Blackwell.

Inventor:
O. W. Noble.
By C. B. Tuttle
Att'y

UNITED STATES PATENT OFFICE.

OSCAR W. NOBLE, OF LYNN, MASSACHUSETTS, ASSIGNOR TO THE NOBLE STOVE COMPANY, OF MANCHESTER, NEW HAMPSHIRE.

HOT-WATER BOILER.

SPECIFICATION forming part of Letters Patent No. 382,659, dated May 8, 1888.

Application filed September 1, 1887. Serial No. 248,460. (No model.)

*To all whom it may concern:*

Be it known that I, OSCAR W. NOBLE, of Lynn, in the county of Essex and Commonwealth of Massachusetts, have invented certain Improvements in Hot-Water Heating Apparatus, of which the following, taken in connection with the accompanying drawings, is a specification.

This invention relates to hot-water boilers, and the nature thereof is hereinafter fully described, and then specifically pointed out in the claims.

Figure 1:
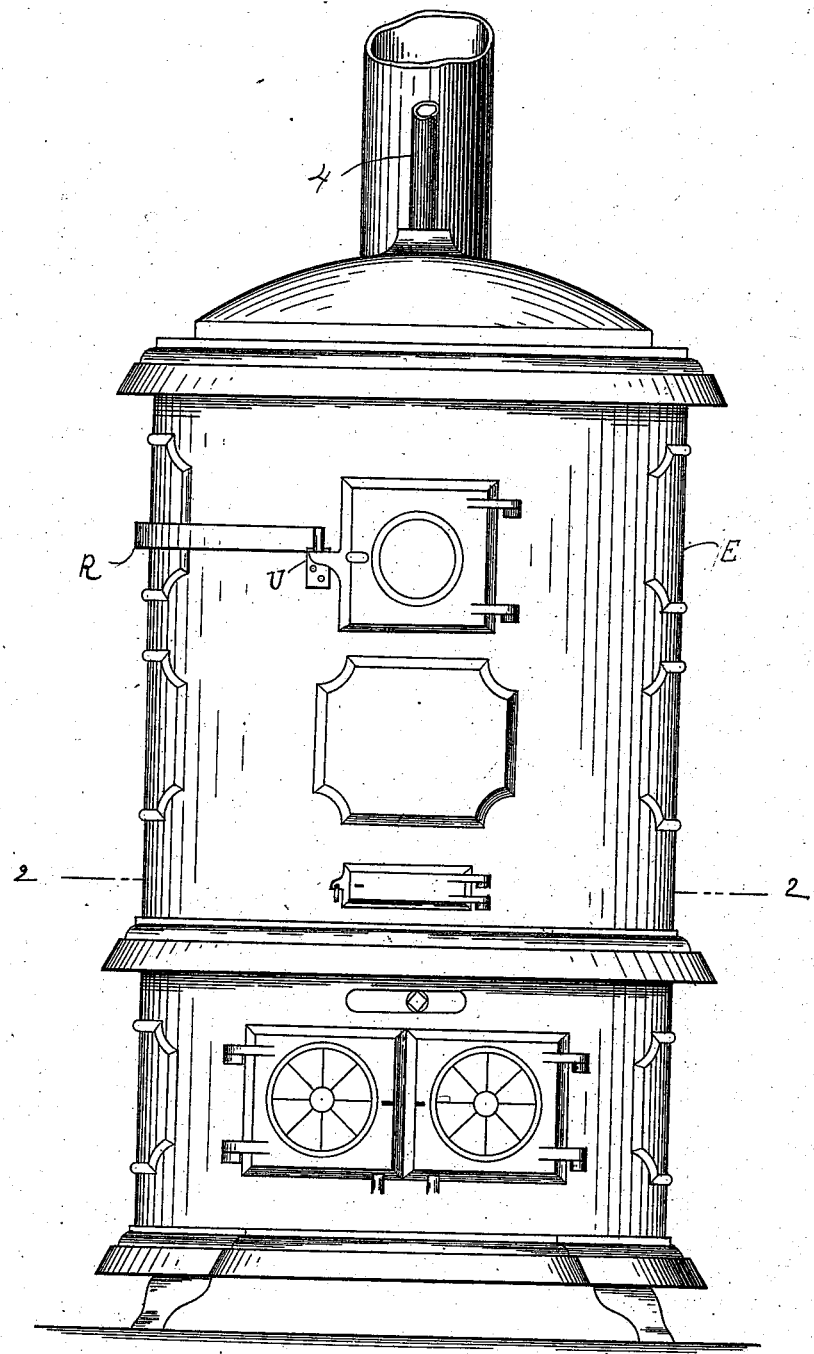
Figure 5:
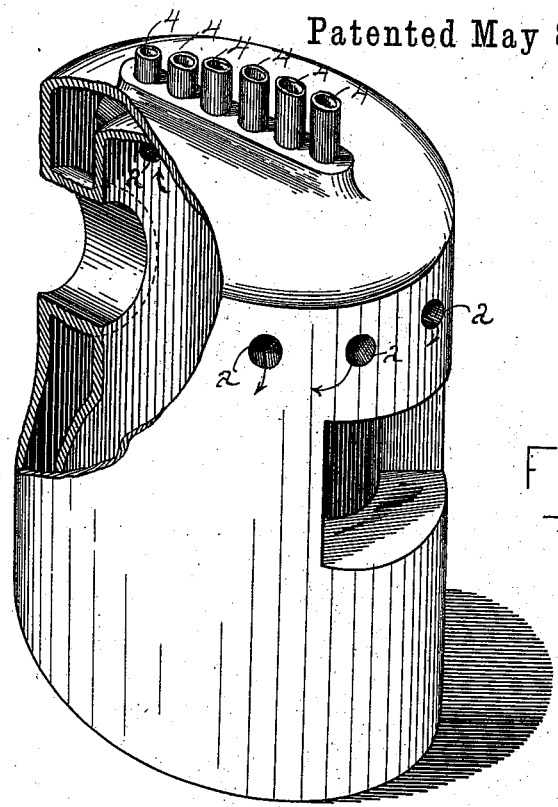
Figure 2:
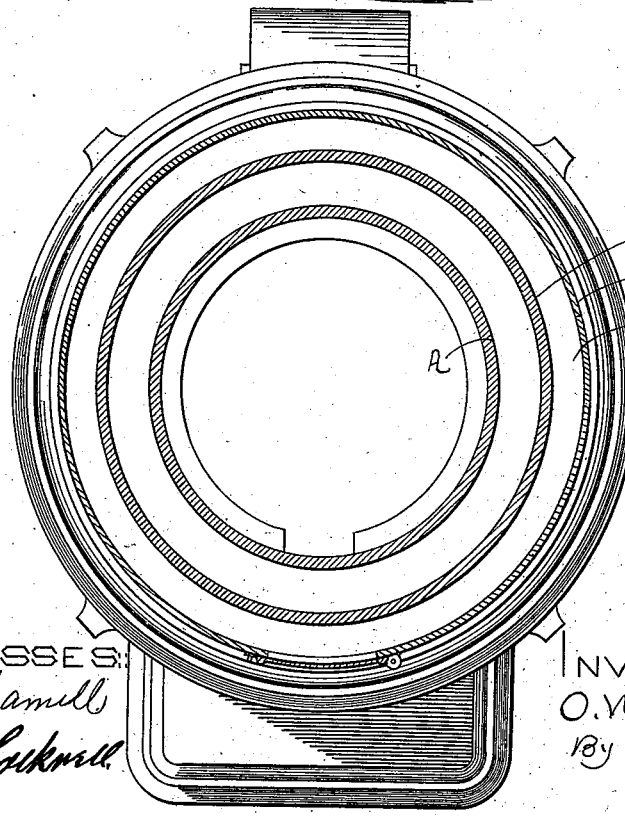
Figure 6:
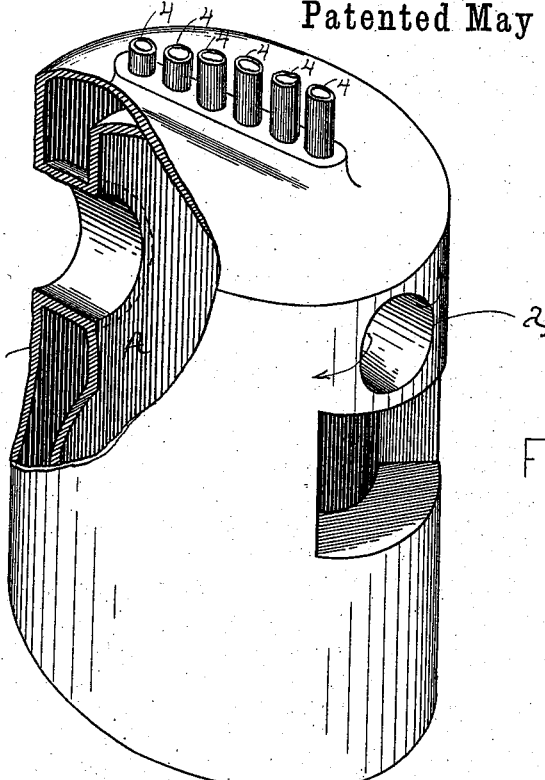
Figure 4:
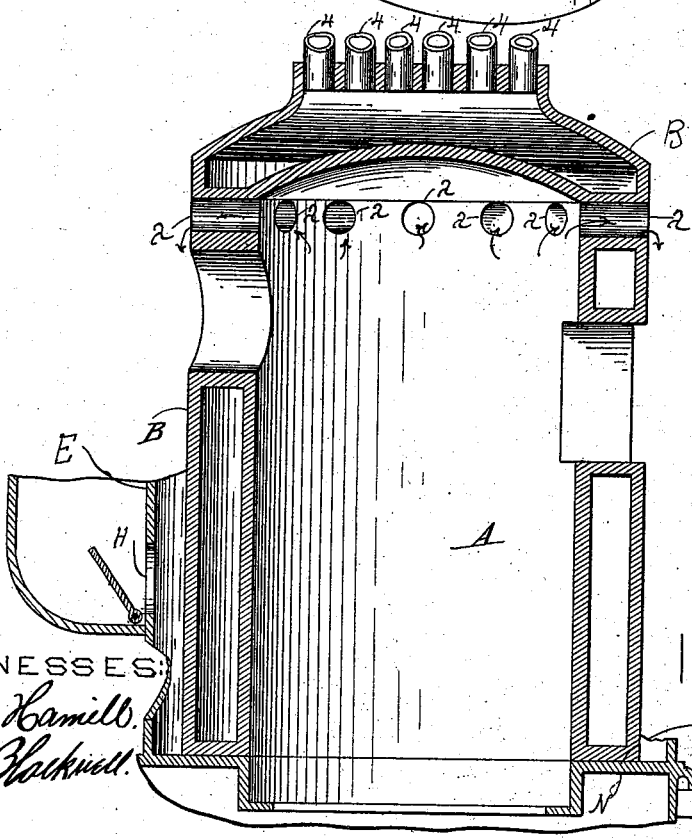

Referring to the drawings, Figure 1 is a front elevation of a heating apparatus embodying this invention. Fig. 2 is a plan of a section on line 2 2, Fig. 1. Fig. 3 is a sectional side elevation. Fig. 4 is a sectional detail, to be referred to hereinafter. Fig. 5 shows in perspective the casings of the fire-pot and water-chamber. Fig. 6 is a modified form of the casing for fire-pot and water-chamber.

In the drawings, A represents the fire-pot, which is surrounded by an outer jacket, B, and between these two casings is a chamber for the reception of water. Said chamber extends entirely round the fire-pot and over the top thereof as a dome. The whole is surrounded by an outer casing, E, between which and the outer jacket is a chamber, F, which communicates with the fire-pot through a series of openings, a, and is provided with an exit-opening, H. The openings a are designed for conducting heat, smoke, and the products of combustion outward from the fire-pot to the chamber F, and to this end they extend entirely through the water-jacket. The heat and products of combustion while passing through these holes operate to heat the surface, and when passed through they pass downward and upward through the chamber F to the exit H, from which it will be understood that the heat in passing from the fire-box is distributed about the outer surface of the water-jacket and economy in fuel is the result.

I prefer to make the openings a of a size such that together they will approximate the size of the exit-opening H, although I am aware that a single opening a placed in or near the front of the boiler, as represented in Fig. 6 of the drawings, would effect the desired result to some extent.

I prefer to employ a series of openings extending round the boiler, as represented in the drawings, but would not be understood as limiting myself to this particular form of construction.

The fire-pot and water-jacket are represented in Fig. 5 of the drawings, and are formed of a single piece of cast-iron. The inner lining of the water-jacket constitutes the fire-pot, and between this and the outer casing is a water-chamber. It has an opening in front through which fuel is introduced to the fire-pot, and in the rear it is provided with an opening which is governed by a suitable damper, M, adapted to be opened and shut as occasion requires. In operation it is placed with its bottom bearing upon the base N, directly above the grate and draft-chamber, as shown in Fig. 4. It will be understood that the water-chamber commences at the bottom and surrounds the fire-pot and extends over the top thereof as a dome. Connected with the damper M is a rod, R, that extends forward to the fuel-door, and in the end of said rod is a notch adapted to engage a corresponding projection, U, from the casing E. The engagement is effected by dropping the rod down over the projection, and the damper is so balanced that whenever the rod is lifted and thereby disengaged it will fall outward, drawing back the said rod, and open a communication from the fire-pot directly into the exhaust-pipe. All products of combustion will then pass directly into the draft-pipe without passing down through the chamber F, as before described. The position of the rod R is such that when engaged its end is located directly above the latch which controls the fuel-door, to the end that the lifting of said latch for the purpose of opening said door will operate to disengage the rod and allow the damper to open, and thereby establish direct communication from the fire-pot to the smoke-pipe before the fuel-door can be swung open. All the back draft and consequent liability of danger from fire and gas coming through the fuel-door is thus avoided.

The figures 3 3 represent the pipes through which water enters the lower portion of the water-jacket, and 4 4 represent the pipes through which the heated water passes from the jacket to the radiating-coils.

Fig. 5 of the drawings represents the fire-pot and water-jacket detached from other parts of the mechanism. It will be understood that the water-jacket extends entirely round the fire-pot down to the bottom thereof and over the top thereof, and the jacket is formed of a single piece of cast-iron with apertures $a$, the described water-chamber and opening for the fuel-grate.

I claim—

1. In a water-heating apparatus, the combination of a fire-pot with a water-jacket extending down to the grate and over the top of the fire-pot, as shown, and provided with a fuel-receiving opening, as shown, and the casing surrounding said jacket and having an opening therein coinciding with the fuel-opening, and a valved exit-opening opposite the fuel-opening and connecting the combustion-chamber directly with the smoke-flue, substantially as described.

2. In a water-heating apparatus, the combination of a fire-pot with a water-jacket extending down to the grate and over the top of the fire-pot, as shown, and provided with a fuel-receiving opening, as shown, and the casing surrounding said jacket and having an opening therein coinciding with the fuel-opening, and a valved exit-opening opposite the fuel-opening and connecting the combustion-chamber directly with the smoke-flue, a door for covering the fuel-opening, a latch for operating the same, a damper for covering the direct-exit passage, and mechanism between the damper of the exit and the door-latch, whereby a normal movement of the door-latch for releasing the door will operate to displace the damper and open the exit prior to the opening of the door, substantially as described.

Signed at Lynn, Massachusetts, in the presence of two witnesses.

OSCAR W. NOBLE.

Witnesses:
E. E. HAMILL,
C. B. TUTTLE.